(12) United States Patent
Kurian

(10) Patent No.: US 9,171,296 B1
(45) Date of Patent: Oct. 27, 2015

(54) MOBILE CHECK GENERATOR

(71) Applicant: BANK OF AMERICA CORPORATION, Charlotte, NC (US)

(72) Inventor: Manu Jacob Kurian, St. Louis, MO (US)

(73) Assignee: Bank of America Corporation, Charlotte, NC (US)

(*) Notice: Subject to any disclaimer, the term of this patent is extended or adjusted under 35 U.S.C. 154(b) by 0 days.

(21) Appl. No.: 14/339,362

(22) Filed: Jul. 23, 2014

(51) Int. Cl.
- *G06Q 40/00* (2012.01)
- *G06Q 20/04* (2012.01)
- *G06Q 20/36* (2012.01)
- *G06Q 20/32* (2012.01)

(52) U.S. Cl.
CPC ........ *G06Q 20/0425* (2013.01); *G06Q 20/3223* (2013.01); *G06Q 20/36* (2013.01)

(58) Field of Classification Search
CPC ............ G06K 9/00442; G06Q 20/042; G06Q 20/0425; G06Q 20/3223
USPC .......................................................... 235/379
See application file for complete search history.

(56) References Cited

U.S. PATENT DOCUMENTS

| | | | | |
|---|---|---|---|---|
| 8,104,674 | B2* | 1/2012 | Smith et al. | 235/379 |
| 8,332,329 | B1* | 12/2012 | Thiele | 705/64 |
| 2007/0175977 | A1* | 8/2007 | Bauer et al. | 235/379 |
| 2012/0230577 | A1* | 9/2012 | Calman et al. | 382/138 |

* cited by examiner

*Primary Examiner* — Seung Lee

(74) *Attorney, Agent, or Firm* — Michael A. Springs; Moore & Van Allen PLLC; Patrick B. Horne

(57) ABSTRACT

Embodiments for generating a virtual check one a mobile device. The embodiments further receive a request, from the user, to perform a transaction with a merchant; generate a virtual check comprising a checking account number, a bank routing number, and a date; initiate display of the virtual check on a display of the mobile device; receive input from the user corresponding to at least one of a plurality of check fields; and populate the virtual check based on the received input.

18 Claims, 4 Drawing Sheets

MOBILE CHECK GENERATOR

BACKGROUND

Although credit and debit card payments are on the rise, the expenses and additional record keeping involved with card payments are not ideal for all businesses. Checks are considered a viable option to those businesses that wish to expand customer payment options beyond cash but aren't ready to make the leap to card payments. Typically, a check is a document that orders a payment of money from a financial institution account. However, with the increase in a number of alternative payment options, the number of customers that carry their checkbook with them has decreased considerably. There is a need for a system to integrate mobile technology to generate a check as a payment option.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

The embodiments provided herein are directed to systems for generating a check on a mobile device. In some embodiments, the systems include a computer apparatus including a processor and a memory and a software module stored in the memory, comprising executable instructions that when executed by the processor cause the processor to receive a request, from the user, to perform a transaction with a merchant; generate a virtual check comprising a checking account number, a bank routing number, and a date; initiate display of the virtual check on a display of the mobile device; receive input from the user corresponding to at least one of a plurality of check fields; and populate the virtual check based on the received input.

In some embodiments, the executable instructions when executed by the processor further cause the processor to request input from the user for at least one of a plurality of check fields; and in response to receiving the input, generate the virtual check based at least in part on the received input.

In some embodiments, the executable instructions that when executed by the processor cause the processor to receive input from the user corresponding to check fields comprising a payee field and a transaction amount field.

In some embodiments, the executable instructions that when executed by the processor cause the processor to receive input from the user corresponding to check fields comprising a date field, a check number field, a name field, an address field, a memo field and a signature field.

In some embodiments, the executable instructions that when executed by the processor cause the processor to receive information indicating that the populated virtual check has been scanned by the merchant, thereby completing the transaction.

In some embodiments, the executable instructions that when executed by the processor cause the processor to cease display of the virtual check on the display of the mobile device.

In some embodiments, the executable instructions that when executed by the processor cause the processor to capture and store transaction details associated with the completed transaction.

In some embodiments, the executable instructions that when executed by the processor cause the processor to export, from the digital wallet to a budgeting application, some or all of the transaction details associated with the completed transaction.

In some embodiments, the executable instructions that when executed by the processor further cause the processor to determine a product category code indicating a category of a product purchased by the conducted transaction based on an analysis of the memo field of the virtual check.

In some embodiments, the executable instructions that when executed by the processor further cause the processor to receive authorization from the user for the digital wallet to export transaction information from the digital wallet to the budgeting application.

In some embodiments, the executable instructions that when executed by the processor further cause the processor to receive the input from the user corresponding to at least one of a plurality of check fields, wherein the at least one of a plurality of check fields comprises a transaction amount; determine whether a financial institution account associated with the user has available balance, wherein determining further comprises determining that an account balance associated with the financial institution account is greater than the transaction amount; and generate the virtual check based on at least determining that the financial institution account associated with the user has available balance.

BRIEF DESCRIPTION OF THE SEVERAL VIEWS OF THE DRAWINGS

The present embodiments are further described in the detailed description which follows in reference to the noted plurality of drawings by way of non-limiting examples of the present embodiments in which like reference numerals represent similar parts throughout the several views of the drawings and wherein.

DETAILED DESCRIPTION

Figure 1:
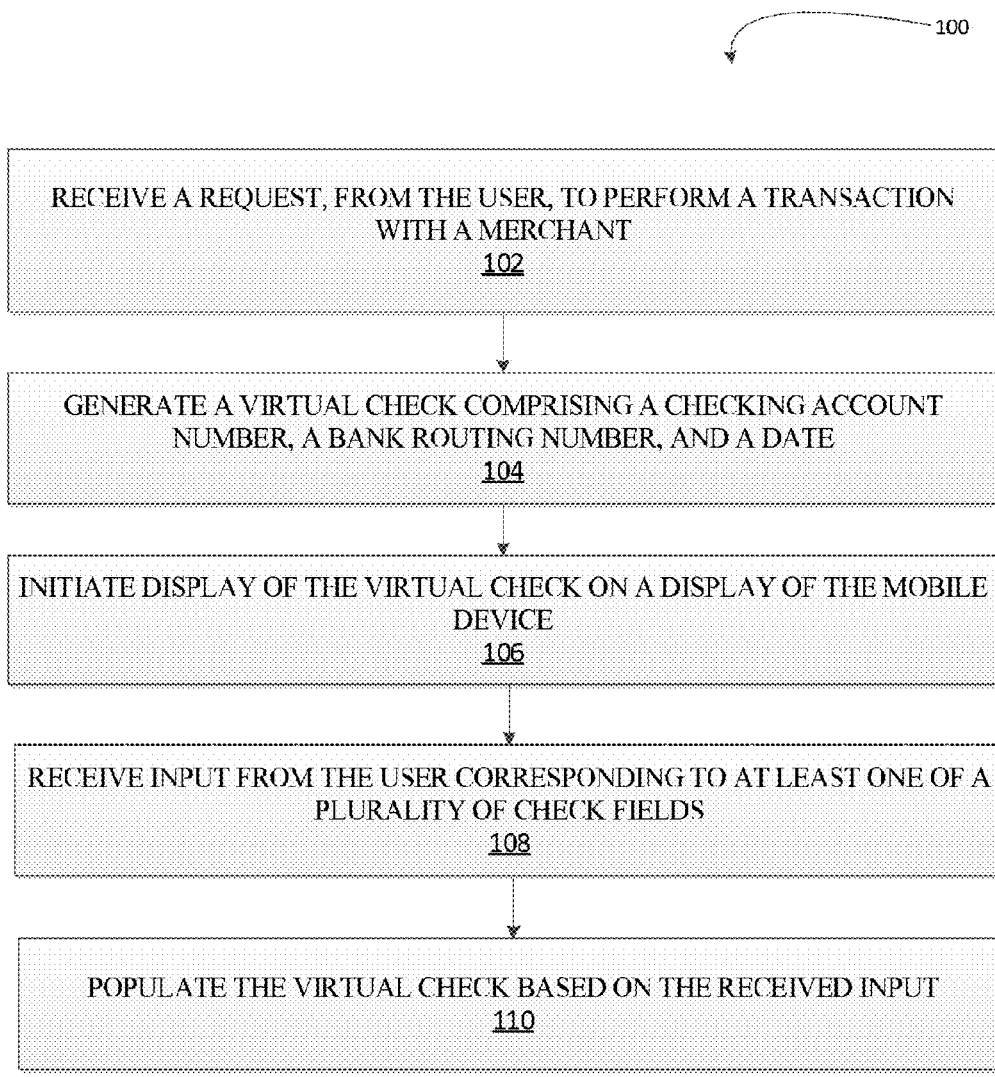
FIG. 1 is a flowchart illustrating a system and method for generating a check on a mobile device.

The embodiments presented herein are directed to systems, methods, and computer program products for generating a check on a mobile device. Although credit and debit card payments are on the rise, the expenses and additional record keeping involved with card payments are not ideal for all businesses. Checks are considered a viable option to those businesses that wish to expand customer payment options beyond cash but aren't ready to make the leap to card payments. Typically, a check is a document that orders a payment of money from a financial institution account. However, with the increase in a number of alternative payment options, the number of customers that carry their checkbook with them has decreased considerably. Embodiments of the present inventions disclose systems, methods, and computer program product for generating a check on a mobile device.

In accordance with embodiments of the invention, the term "financial transaction" or "transaction" refers to any transaction involving directly or indirectly the movement of monetary funds through traditional paper transaction processing systems (i.e. paper check processing) or through electronic transaction processing systems. Typical financial transactions include point of sale (POS) transactions, automated teller machine (ATM) transactions, internet transactions, electronic funds transfers (EFT) between accounts, transactions with a financial institution teller, personal checks, etc. When discussing that transactions are evaluated it could mean that the transaction has already occurred, is in the processing of occurring or being processed, or it has yet to be processed by one or more financial institutions. In some embodiments of the invention the transaction may be a customer account event, such as but not limited to the customer changing a password, ordering new checks, adding new accounts, opening new accounts, etc.

In accordance with embodiments of the invention, the term "financial institution" refers to any organization in the business of moving, investing, or lending money, dealing in financial instruments, or providing financial services. This includes commercial banks, thrifts, federal and state savings banks, savings and loan associations, credit unions, investment companies, merchants, insurance companies and the like.

In accordance with embodiments of the invention the terms "customer" and "user" and "consumer" may be interchangeable. These terms may relate to a direct customer of the financial institution or person or entity that has authorization to act on behalf of the direct customer, user, or consumer (i.e., indirect customer). In one aspect, the system may be a software application designed to run on a mobile device (e.g., a smartphone, cellular phone, personal digital assistant (PDA)) associated with the user in association with the stored digital mobile wallet. In another aspect, the system may include an interpretation algorithm designed to run on the point-of-sale device associated with the merchant designed to execute transactions using the generated bank card number.

FIG. 1 illustrates a process flow for generating a check on a mobile device 100. As shown in block 102, the process flow includes receiving a request from a user to perform a transaction with a merchant. In response, the process flow includes generating a virtual check comprising a checking account number, a banking account number, and a date, as shown in block 104. In response to generating a virtual check, the process flow includes initiating display of the virtual check on a display of the mobile device, as shown in block 106. The system may then be configured to receive input from the user corresponding to at least one of a plurality of check fields, as shown in block 108. Once the system receives the input from the user, the process flow includes populate the virtual check based on the received input, as shown in block 110.

In some embodiments, the one or more check fields may be pre-filled. In this regard, the system may be configured to initiate the display of the virtual check on the display of the mobile device with one or more pre-filled check fields and receive user input corresponding to the one or more check fields that haven't been pre-filled. For example, the system may be configured to enable the user to set up a recurring check payment such as rent with one or more specific recipients such as a landlord. In such situations, the system may be configured to pre-fill one or more check fields such as payee (e.g., landlord) and transaction amount (e.g., rent amount). The user may then provide input in the signature line to complete the virtual check.

In one aspect, the one or more check fields include at least one of a personalization field including a name field and an address field, date field, a check number, a memo field, and a signature field. In another aspect, the virtual check may include bank identification numbers such as a checking account number, a routing number, a user number, and a check number. This information may be used by a bank to identify the transaction and resolve payment issues.

In some embodiments, the system may be configured to enable the user to receive the virtual check and utilize the virtual check to execute a financial transaction. In this regard, the user may present the virtual check to a merchant at a point-of-sale terminal of the merchant to complete the transaction. In some embodiments, the point-of-sale terminal of the merchant may include one or more applications capable of working synchronously with the virtual check generated on the mobile device. In some other embodiments, the virtual check may be transmitted wirelessly to the point-of-sale terminal of the merchant. In this regard, the system may be configured to enable the merchant to receive the virtual check as a valid payment vehicle and process the received virtual check to complete the transaction. For example, the virtual check may be transmitted using Near Field Communication (NFC), such as by the user "bumping"/"tapping" the send and/or receive the virtual check and/or other information.

In some embodiments, system may be configured to receive a virtual check from another user and present the virtual check to the financial institution. In one aspect, the system may be configured to enable the user to deposit the received virtual check using the mobile device of the user. In another aspect, the system may be configured to enable the user to present the received virtual check to an ATM to deposit the virtual check. In some embodiments, depositing the check may enable the system to receive verification from the source of the virtual check. In this regard, the user associated with generating the virtual check may be contacted to verify the information (e.g., one or more check fields) associated with the check prior to authorizing the check deposit.

In some embodiment, the system may be configured to receive the input from the user corresponding to at least one of a plurality of check fields to generate a virtual check. In response, the system may determine whether the financial institution account associated with the user has sufficient funds prior to generating the virtual check. In this way, the system may reduce the chances of a bounced check. Typically, a check is considered bounced when the check deposited by the payee cannot be processed because the financial institution account associated with the writer of the check has unavailable funds. Typically, the virtual check generated may have the current date in the date field to avoid any discrepancies in the transaction process. In one aspect, the system may be configured to generate a post-dated virtual check for valued and good-standing users for up to a predetermined threshold amount. In another aspect, the system may be configured to generate a post-dated virtual check for users based on the user's credit score.

Figure 2:
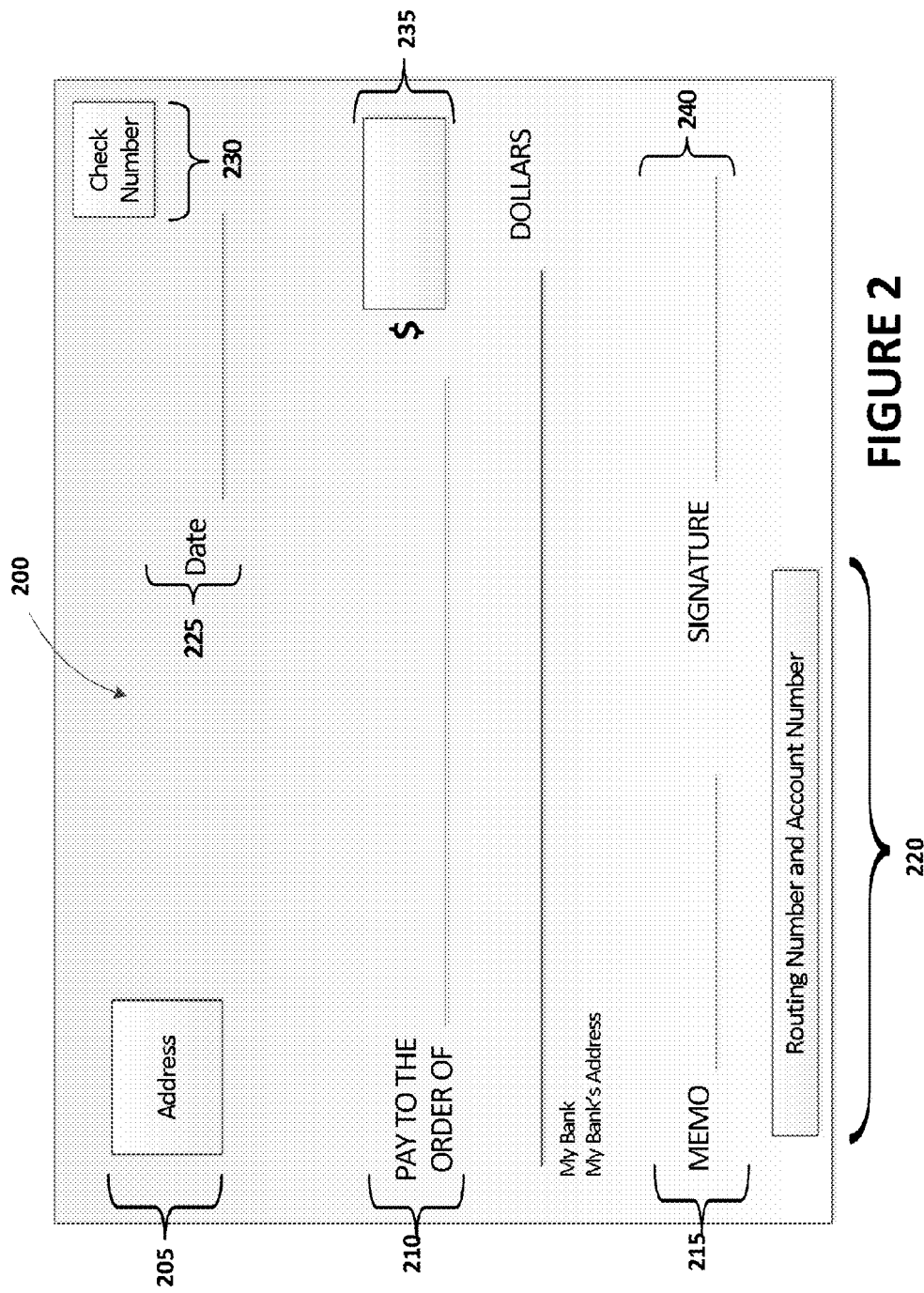
FIG. 2 illustrates an exemplary embodiment of a check template in accordance with various embodiments.

Referring now to FIG. 2, a check template 200 illustrated. In the illustrated embodiment, the check template 200 corresponds to the entire front portion of a check, but it will be understood that the check template 200 may also correspond to individual pieces of check information, portions of a check, or the like. The check template, in some embodiments, includes the format of certain types of checks associated with a bank, a merchant, an account holder, types of checks, style of checks, check manufacturer, and so forth. By using the check template, the system of process 100 any other system can "learn" to retrieve the key attributes of the check for faster and more accurate processing. In some embodiments, financial records are categorized by template. The check template 200 is only an exemplary template for a financial record, and other check templates or other financial record templates may be utilized to categorize checks or other financial records. The check template 200 can be used in the OCR processes, image overlay techniques, and the like.

The check template 200 comprises check information, wherein the check information includes, for example, a contact information field 205, a payee line field 210, a memo description field 215, an account number and routing number field 220 associated with the appropriate user or customer account, a date line field 225, a check number field 230, an amount box field 235, a signature line field 240, or the like.

Figure 3:
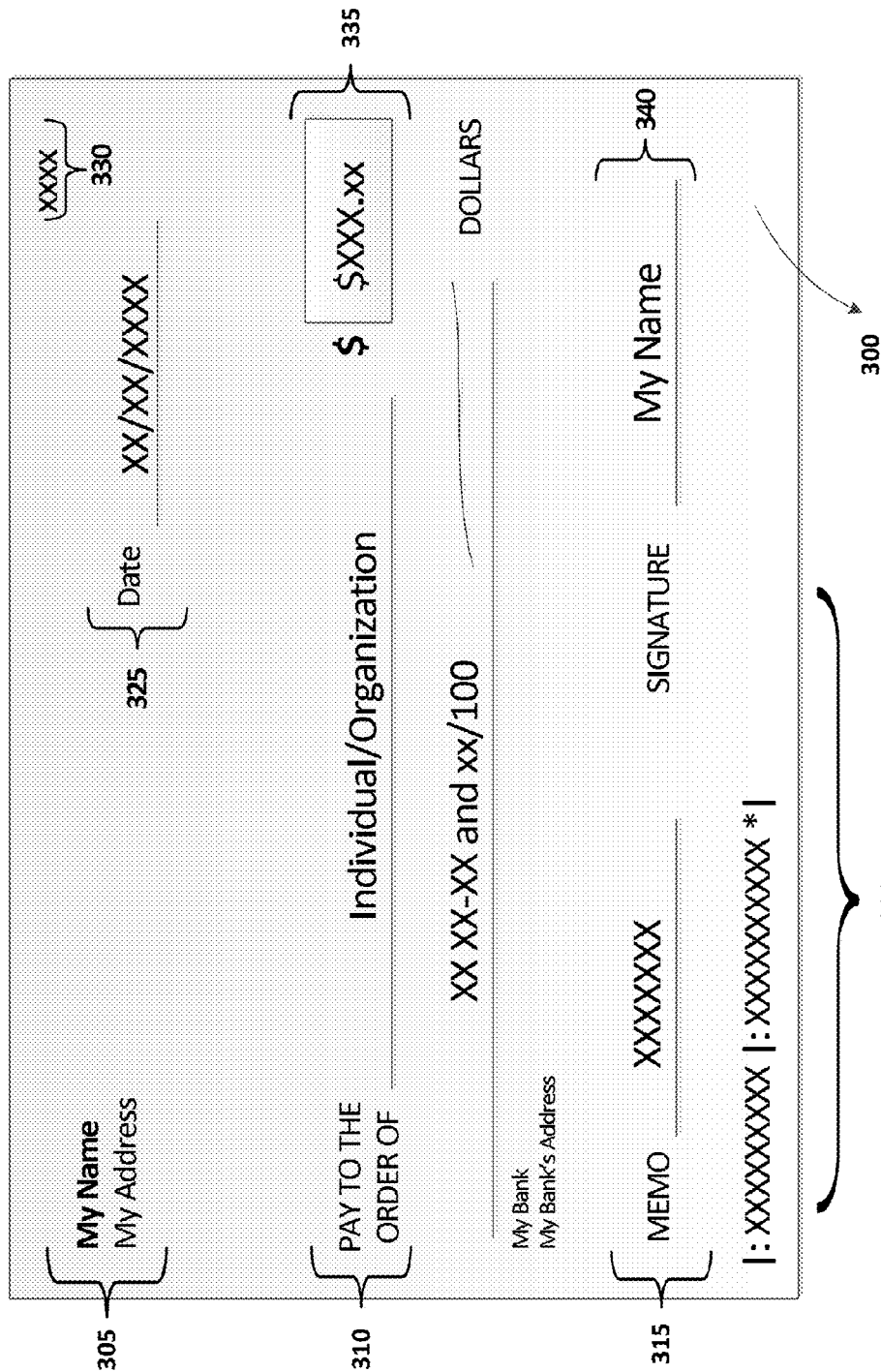
FIG. 3 illustrates an exemplary embodiment of an image of the generate virtual check.

Referring now to FIG. 3, an exemplary image of the generated virtual check 300 is illustrated. The image of virtual check 300 may comprise an image of the entire virtual check, a thumbnail version of the image of the virtual check, individual pieces of virtual check information, all or some portion of the front of the virtual check, all or some portion of the back of the virtual check, or the like. Virtual check 300 comprises check information, wherein the check information comprises contact information 205, the payee 210, the memo description 215, the account number and routing number 220 associated with the appropriate user or customer account, the date 225, the check number 230, the amount of the check 235, the signature 240, or the like. In some embodiments, the check information may comprise text. In other embodiments, the check information may comprise an image. The user may utilize the generated virtual check to conduct the financial transaction.

In some embodiments, the system may collect the check information from the image of the generated virtual check 300 and store the check information in a database as metadata (e.g., the database 438 of FIG. 4) for future use. In some embodiments, the pieces of check information may be stored in the database individually. In other embodiments, multiple pieces of check information may be stored in the database together.

Mobile Check Generator

Figure 4:
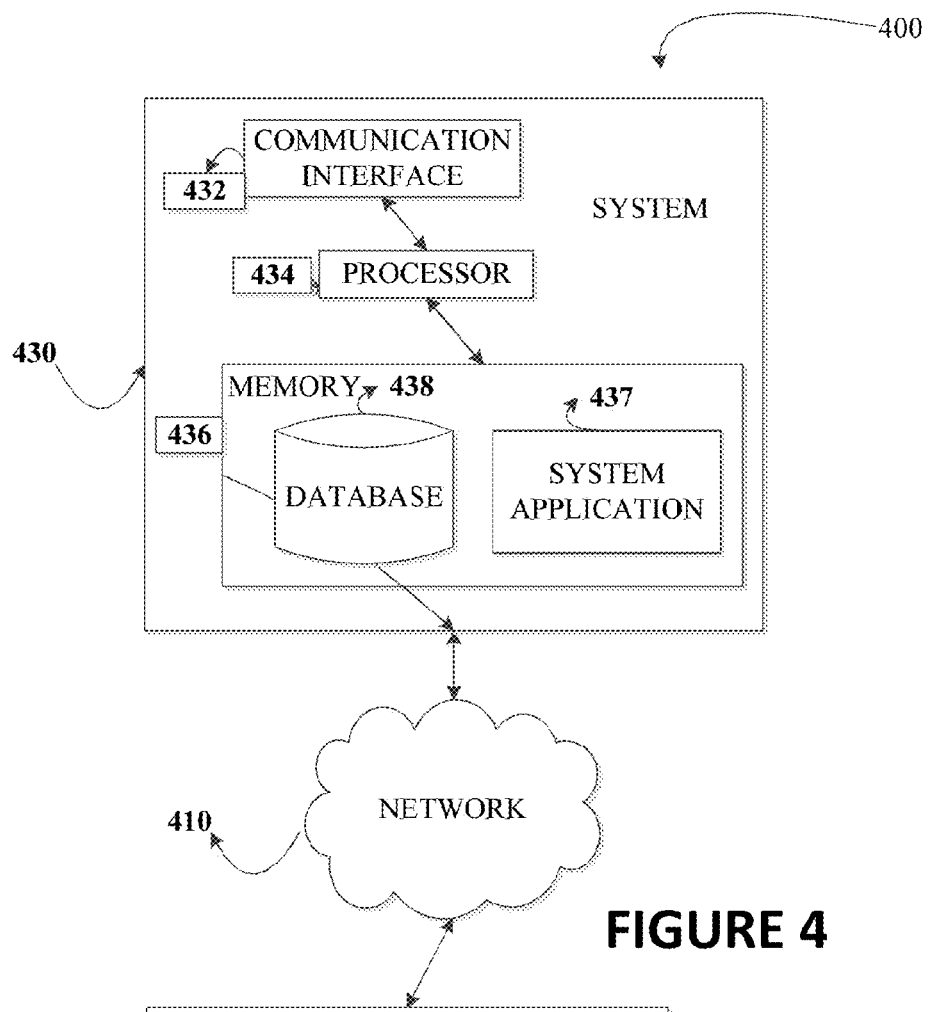
FIG. 4 illustrates an exemplary system for generating a check on a mobile device.
Figure 4:
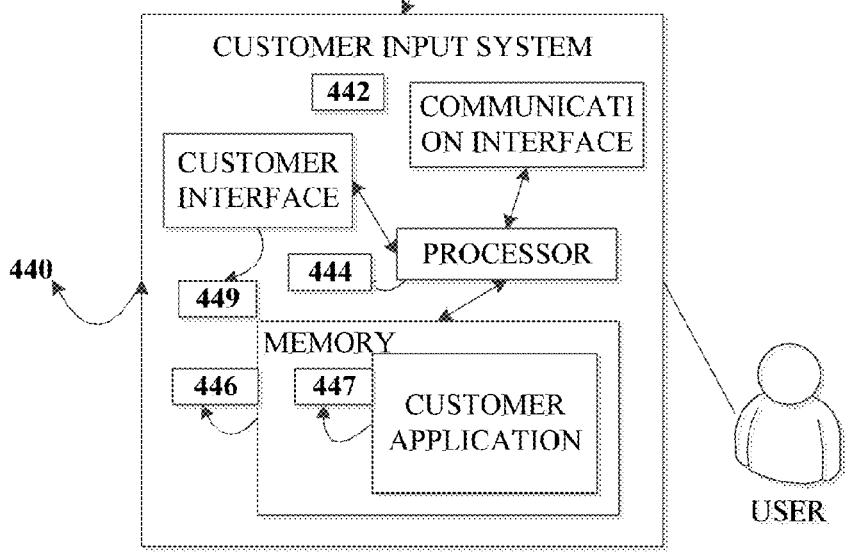

FIG. 4 presents an exemplary block diagram of the system environment 400 for implementing the process flows described herein in accordance with embodiments of the present invention. As illustrated, the system environment 400 includes a network 410, a system 430, and a user input system 440. Also shown in FIG. 4 is a user of the user input system 440. The user input system 440 may be a mobile device or other non-mobile computing device. The user may be a person who uses the user input system 440 to execute a user application 447. The user application 447 may be an application to communicate with the system 430, perform a transaction, input information onto a user interface presented on the user input system 440, or the like. The user application 447 and/or the system application 437 may incorporate one or more parts of any process flow described herein.

As shown in FIG. 4, the system 430, and the user input system 440 are each operatively and selectively connected to the network 410, which may include one or more separate networks. In addition, the network 410 may include a telecommunication network, local area network (LAN), a wide area network (WAN), and/or a global area network (GAN), such as the Internet. It will also be understood that the network 410 may be secure and/or unsecure and may also include wireless and/or wired and/or optical interconnection technology.

The user input system 440 may include any computerized apparatus that can be configured to perform any one or more of the functions of the user input system 440 described and/or contemplated herein. For example, the user may use the user input system 440 to transmit and/or receive information or commands to and from the system 430. In some embodiments, for example, the user input system 440 may include a personal computer system (e.g. a non-mobile or non-portable computing system, or the like), a mobile computing device, a personal digital assistant, a mobile phone, a tablet computing device, a network device, and/or the like. As illustrated in FIG. 4, in accordance with some embodiments of the present invention, the user input system 440 includes a communication interface 442, a processor 444, a memory 444 having an user application 447 stored therein, and a user interface 449. In such embodiments, the communication interface 442 is operatively and selectively connected to the processor 444, which is operatively and selectively connected to the user interface 449 and the memory 444. In some embodiments, the user may use the user application 447 to execute processes described with respect to the process flows described herein. Specifically, the user application 447 executes the process flows described herein.

Each communication interface described herein, including the communication interface 442, generally includes hardware, and, in some instances, software, that enables the user input system 440, to transport, send, receive, and/or otherwise communicate information to and/or from the communication interface of one or more other systems on the network 410. For example, the communication interface 442 of the user input system 440 may include a wireless transceiver, modem, server, electrical connection, and/or other electronic device that operatively connects the user input system 440 to another system such as the system 430. The wireless transceiver may include a radio circuit to enable wireless transmission and reception of information. Additionally, the user input system 440 may include a positioning system. The positioning system (e.g. a global positioning system (GPS), a network address (IP address) positioning system, a positioning system based on the nearest cell tower location, or the like) may enable at least the user input system 440 or an external server or computing device in communication with the user input system 440 to determine the location (e.g. location coordinates) of the user input system 440.

Each processor described herein, including the processor 444, generally includes circuitry for implementing the audio, visual, and/or logic functions of the user input system 440. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as in the user application 447 of the memory 444 of the user input system 440.

Each memory device described herein, including the memory 444 for storing the user application 447 and other information, may include any computer-readable medium. For example, memory may include volatile memory, such as volatile random access memory (RAM) having a cache area for the temporary storage of information. Memory may also include non-volatile memory, which may be embedded and/ or may be removable. The non-volatile memory may additionally or alternatively include an EEPROM, flash memory, and/or the like. The memory may store any one or more of pieces of information and data used by the system in which it resides to implement the functions of that system.

As shown in FIG. 4, the memory 444 includes the user application 447. In some embodiments, the user application 447 includes an interface for communicating with, navigating, controlling, configuring, and/or using the user input system 440. In some embodiments, the user application 447 includes computer-executable program code portions for instructing the processor 444 to perform one or more of the functions of the user application 447 described and/or contemplated herein. In some embodiments, the user application 447 may include and/or use one or more network and/or system communication protocols.

Also shown in FIG. 4 is the user interface 449. In some embodiments, the user interface 449 includes one or more output devices, such as a display and/or speaker, for presenting information to the user. In some embodiments, the user interface 449 includes one or more input devices, such as one or more buttons, keys, dials, levers, directional pads, joysticks, accelerometers, controllers, microphones, touchpads, touchscreens, haptic interfaces, microphones, scanners, motion detectors, cameras, and/or the like for receiving information from the user. In some embodiments, the user interface 449 includes the input and display devices of a mobile device, which are operable to receive and display information.

FIG. 4 also illustrates a system 430, in accordance with an embodiment of the present invention. The system 430 may refer to the "apparatus" described herein. The system 430 may include any computerized apparatus that can be configured to perform any one or more of the functions of the system 430 described and/or contemplated herein. In accordance with some embodiments, for example, the system 430 may include a computer network, an engine, a platform, a server, a database system, a front end system, a back end system, a personal computer system, and/or the like. Therefore, the system 430 may be a server managed by the entity. The system 430 may be located at the facility associated with the entity or remotely from the facility associated with the entity. In some embodiments, such as the one illustrated in FIG. 4, the system 430 includes a communication interface 432, a processor 434, and a memory 434, which includes a system application 437 and a structured database 438 stored therein. As shown, the communication interface 432 is operatively and selectively connected to the processor 434, which is operatively and selectively connected to the memory 434.

It will be understood that the system application 437 may be configured to implement any one or more portions of the various user interfaces and/or process flow described herein. The system application 437 may interact with the user application 447. It will also be understood that, in some embodiments, the memory includes other applications. It will also be understood that, in some embodiments, the system application 437 is configured to communicate with the structured database 438, the user input system 440, or the like.

It will be further understood that, in some embodiments, the system application 437 includes computer-executable program code portions for instructing the processor 434 to perform any one or more of the functions of the system application 437 described and/or contemplated herein. In some embodiments, the system application 437 may include and/or use one or more network and/or system communication protocols.

In addition to the system application 437, the memory 434 also includes the structured database 438. As used herein, the structured database 438 may be one or more distinct and/or remote databases. In some embodiments, the structured database 438 is not located within the system and is instead located remotely from the system. In some embodiments, the structured database 438 stores information or data described herein.

It will be understood that the structured database 438 may include any one or more storage devices, including, but not limited to, datastores, databases, and/or any of the other storage devices typically associated with a computer system. It will also be understood that the structured database 438 may store information in any known way, such as, for example, by using one or more computer codes and/or languages, alphanumeric character strings, data sets, figures, tables, charts, links, documents, and/or the like. Further, in some embodiments, the structured database 438 may include information associated with one or more applications, such as, for example, the system application 437. It will also be understood that, in some embodiments, the structured database 438 provides a substantially real-time representation of the information stored therein, so that, for example, when the processor 434 accesses the structured database 438, the information stored therein is current or substantially current.

FIG. 4 illustrates an exemplary process flow for a system for reviewing customer information, 400. As shown in block 402, the system may be configured to receive information from a customer. In one aspect, the information received from the customer may be based on the financial institution service provided to the customer. In response, the system may be configured to generate one or more documents, as shown in block set 404. In one aspect, a portion of the one or more documents generated may have customer information. As shown in the Figure, document 1, document 3, and document 4 have customer information. In response, the one or more generated documents may be stored in a financial institution database, as shown in block 404. In some embodiments, the system may be configured to retrieve one or more documents having customer information from the financial institution database, as shown in block set 408. The system may then extract customer information from the retrieved one or more documents and compare 412 the extracted customer information 410 with the received customer information, as shown in block 414 to determine a match. If the customer information extracted from the retrieved one or more documents and the received customer information match, the system may validate the information, as shown in block 414. If the customer information extracted from the retrieved one or more documents and the received customer information do not match, the system may then edit the information to ensure that they match and store the one or more edited documents in the financial institution database, as shown in block 418.

It will be understood that the embodiment of the system environment illustrated in FIG. 4 is exemplary and that other embodiments may vary. As another example, in some embodiments, the system 430 includes more, less, or different components. As another example, in some embodiments, some or all of the portions of the system environment 400 may be combined into a single portion. Likewise, in some embodiments, some or all of the portions of the system 430 may be separated into two or more distinct portions.

In addition, the various portions of the system environment 400 may be maintained for and/or by the same or separate parties. It will also be understood that the system 430 may include and/or implement any embodiment of the present invention described and/or contemplated herein. For example, in some embodiments, the system 430 is configured to implement any one or more of the embodiments of the process flows described and/or contemplated herein in connection any process flow described herein. Additionally, the system 430 or the user input system 440 is configured to initiate presentation of any of the user interfaces described herein.

In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, microcode, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A mobile device for generating a virtual check using a digital wallet module running on the mobile device of a user, whereby the virtual check is used to perform a transaction with a merchant, the mobile device comprising:
   a computer apparatus including a processor and a memory; and
   a digital wallet module stored in the memory, comprising executable instructions that when executed by the processor cause the processor to:
      receive a request, from the user, to perform a transaction with a merchant;
      generate a virtual check comprising a checking account number, a bank routing number, and a date;
      initiate display of the virtual check on a display of the mobile device;
      receive input from the user corresponding to at least one of a plurality of check fields;
      populate the virtual check based on the received input; and
      receive information indicating that the populated virtual check has been scanned by the merchant, thereby completing the transaction.

2. The mobile device of claim 1, wherein the executable instructions when executed by the processor further cause the processor to:
   request input from the user for at least one of a plurality of check fields; and
   in response to receiving the input, generate the virtual check based at least in part on the received input.

3. The mobile device of claim 1, wherein the executable instructions that when executed by the processor cause the processor to:
   receive input from the user corresponding to check fields comprising a payee field and a transaction amount field.

4. The mobile device of claim 1, wherein the executable instructions that when executed by the processor cause the processor to:
   receive input from the user corresponding to check fields comprising a date field, a check number field, a name field, an address field, a memo field and a signature field.

5. The mobile device of claim 1, wherein the executable instructions that when executed by the processor cause the processor to:
   cease display of the virtual check on the display of the mobile device.

6. The mobile device of claim 1, wherein the executable instructions that when executed by the processor cause the processor to:
   capture and store transaction details associated with the completed transaction.

7. The mobile device of claim 6, wherein the executable instructions that when executed by the processor cause the processor to:
   export, from the digital wallet to a budgeting application, some or all of the transaction details associated with the completed transaction.

8. The mobile device of claim 6, wherein the executable instructions that when executed by the processor further cause the processor to:
   determine a product category code indicating a category of a product purchased by the conducted transaction based on an analysis of the memo field of the virtual check.

9. The mobile device of claim 6, wherein the executable instructions that when executed by the processor further cause the processor to:
   receive authorization from the user for the digital wallet to export transaction information from the digital wallet to the budgeting application.

10. The mobile device of claim 1, wherein the executable instructions that when executed by the processor further cause the processor to:
    receive the input from the user corresponding to at least one of a plurality of check fields, wherein the at least one of a plurality of check fields comprises a transaction amount;
    determine whether a financial institution account associated with the user has available balance, wherein determining further comprises determining that an account balance associated with the financial institution account is greater than the transaction amount; and
    generate the virtual check based on at least determining that the financial institution account associated with the user has available balance.

11. A computer program product for generating a virtual check on a mobile device, the computer program product comprising a non-transitory computer-readable medium comprising code causing a first apparatus to:
    receive a request, from the user, to perform a transaction with a merchant;
    generate a virtual check comprising a checking account number, a bank routing number, and a date;
    initiate display of the virtual check on a display of the mobile device;
    receive input from the user corresponding to at least one of a plurality of check fields;
    populate the virtual check based on the received input; and
    receive information indicating that the populated virtual check has been scanned.

12. The computer program product of claim 11, wherein the first apparatus is configured to:
    request input from the user for at least one of a plurality of check fields; and
    in response to receiving the input, generate the virtual check based at least in part on the received input.

13. The computer program product of claim 11, wherein the first apparatus is configured to:
    receive input from the user corresponding to check fields comprising a date field, a check number field, a name field, an address field, a memo field and a signature field.

14. The computer program product of claim 11, wherein the first apparatus is configured to cease display of the virtual check on the display of the mobile device.

15. The computer program product of claim 11, wherein the first apparatus is configured to capture and store transaction details associated with the completed transaction.

16. A computer-implemented method for generating a virtual check on a mobile device, the method comprising:
    receiving, using a computing device processor, a request, from the user, to perform a transaction with a merchant;
    generating, using a computing device processor, a virtual check comprising a checking account number, a bank routing number, and a date;
    initiating, using a computing device processor, display of the virtual check on a display of the mobile device;

receiving, using a computing device processor, input from the user corresponding to at least one of a plurality of check fields;

populating, using a computing device processor, the virtual check based on the received input; and receiving, using a computing device processor, information indicating that the populated virtual check has been scanned.

17. The computer implemented method for claim 16, wherein the method further comprises:

receiving the input from the user corresponding to at least one of a plurality of check fields, wherein the at least one of a plurality of check fields comprises a transaction amount;

determining whether a financial institution account associated with the user has available balance, wherein determining further comprises determining that an account balance associated with the financial institution account is greater than the transaction amount; and generating the virtual check based on at least determining that the financial institution account associated with the user has available balance.

18. The computer implemented method for claim 16, wherein the method further comprises receiving input from the user corresponding to check fields comprising a date field, a check number field, a name field, an address field, a memo field, a signature field, a payee field and a transaction amount field.

* * * * *